United States Patent [19]

Ishikawa et al.

[11] Patent Number: 5,540,577
[45] Date of Patent: Jul. 30, 1996

[54] INJECTION MOLDING MACHINE CAPABLE OF REDUCING THE WORK REQUIRED TO AN OPERATOR

[75] Inventors: Atsushi Ishikawa; Yoshiyuki Imatomi; Kazuo Hiraoka; Yoshihiko Nagata; Hitoshi Hara, all of Chiba, Japan

[73] Assignee: Sumitomo Heavy Industries, Ltd., Tokyo, Japan

[21] Appl. No.: 312,965

[22] Filed: Sep. 30, 1994

[30]  Foreign Application Priority Data

| Oct. 1, 1993 | [JP] | Japan | 5-246513 |
| Oct. 1, 1993 | [JP] | Japan | 5-246514 |
| Oct. 1, 1993 | [JP] | Japan | 5-246786 |
| Oct. 1, 1993 | [JP] | Japan | 5-246808 |
| Oct. 1, 1993 | [JP] | Japan | 5-247038 |
| Oct. 1, 1993 | [JP] | Japan | 5-247048 |
| Oct. 1, 1993 | [JP] | Japan | 5-247171 |
| Oct. 1, 1993 | [JP] | Japan | 5-247175 |
| Dec. 28, 1993 | [JP] | Japan | 5-336692 |
| Jan. 13, 1994 | [JP] | Japan | 6-002229 |

[51] Int. Cl.⁶ ............................................ B29C 45/80
[52] U.S. Cl. ............................... 425/150; 264/40.5
[58] Field of Search ........................ 425/145, 149, 425/150; 264/40.5

[56] References Cited

U.S. PATENT DOCUMENTS

| 3,857,658 | 12/1974 | Muzsnay | 425/150 |
| 3,939,329 | 2/1976 | Doran | 425/149 |
| 3,940,465 | 2/1976 | Hauser et al. | 425/150 |
| 4,131,596 | 12/1978 | Allen | 425/150 |

*Primary Examiner*—Tim Heitbrink
*Attorney, Agent, or Firm*—Burns, Doane, Swecker & Mathis, L.L.P.

[57] ABSTRACT

In an injection molding machine which comprises a mold composed of a fixed mold attached to a fixed platen and a movable mold attached to a movable platen, and a driving source for driving the movable platen to open and close the mold, a distance sensor detects, as a platen interval, a distance between two positions preliminarily selected on the fixed platen and the movable platen and produces a distance detection signal. A pressure sensor detects a clamping pressure applied by the driving source and produces a pressure detection signal. A control unit controls the driving source to adjust the platen interval and the clamping pressure through a plurality of steps in response to the distance detection signal and the pressure detection signal.

15 Claims, 13 Drawing Sheets

INJECTION MOLDING MACHINE CAPABLE OF REDUCING THE WORK REQUIRED TO AN OPERATOR

BACKGROUND OF THE INVENTION

This invention relates to an injection molding machine adapted to molding of a resin material and, in particular, to a control system capable of improving the facility of operation executed by an operator.

Generally, injection molding of a resin product is carried out through a molding cycle comprising a resin melting process, a filling process, a holding process, and a cooling process. In order to obtain a molded product having an excellent quality, it is a common practice to control a temperature of a mold comprising a fixed mold and a movable mold, a temperature of a resin material within the mold, an injection pressure, and the like. In addition to such control, it is also important to control a clamping pressure applied to the mold and a mold opening which is a distance between opposite surfaces of the fixed mold and the movable mold. These opposite surfaces are called parting surfaces. Furthermore, it is important to determine a timing of switching from the filling process to the holding process, namely, V-P (velocity-pressure) switching. Thus, control of various factors is required to obtain a molded product having an excellent quality.

By way of example, description will be given as regards control of the clamping pressure. The clamping pressure is defined by a clamping force F which is calculated in accordance with the following equation:

$$F=A \cdot P/1000,$$

where A represents a pressure receiving area (cm$^2$) of the molded product while P represents an average internal pressure (kg/cm$^2$) of the mold. In a conventional control system, the clamping pressure is held constant at a preselected clamping pressure throughout an injection process, including the filling process and the holding process, and the cooling process. In such a control system, however, various defects such as short shot, a weld mark or line, and burning are often caused to occur when the preselected clamping pressure is relatively high. Under the clamping pressure which is relatively high, air initially present in the mold when the mold is being filled with the melted resin and gas produced from the melted resin are not discharged from the mold at the end of the injection process. Such air and gas are compressed and remain in the mold. Under the circumstances, an operator decreases the preselected clamping pressure in order to expedite discharge of the air and the gas present within the mold. However, when the preselected clamping pressure is excessively decreased, there arises another problem of occurrence of flash.

Thus, the operator is required to do a lot of delicate work in determination and entry of various preselected values necessary to obtain the molded product having an excellent quality. Therefore, the operator must have long experience and great skill.

SUMMARY OF THE INVENTION

It is therefore an object of this invention to provide an injection molding machine which is capable of reducing the work required to an operator in determination and entry of various preselected values.

It is another object of this invention to provide an injection molding machine which effectively avoid occurrence of various defects such as short shot, a weld mark, burning, flash, and a sink mark.

Other objects of this invention will become clear as the description proceeds.

An injection molding machine to which this invention is applicable comprises a mold composed of a fixed mold attached to a fixed platen and a movable mold attached to a movable platen, and a driving source for moving the movable platen to open and close the mold and for carrying out a clamping operation. The injection molding machine executes an injection molding cycle including a filling process and a holding process. According to this invention, the injection molding machine further comprises a control section comprising a distance sensor for detecting, as a detected platen interval, a distance between two positions preliminarily selected on the fixed platen and the movable platen, respectively, to produce a distance detection signal representative of the detected platen interval, a pressure sensor for detecting, as a detected clamping pressure, a current clamping pressure applied by the driving source to produce a pressure detection signal representative of the detected clamping pressure, a setting unit for entering preselected values including a preselected platen interval and a preselected clamping pressure, and a control unit for controlling the driving source in response to the preselected values, the distance detection signal, and the pressure detection signal to adjust a platen interval and a clamping pressure in a plurality of steps.

Figure 1:
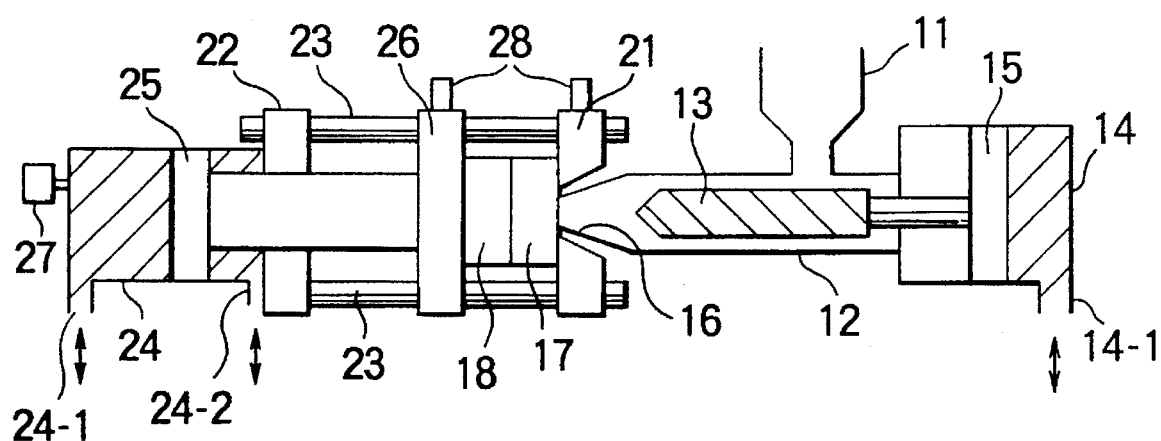
FIG. 1 is a schematic diagram illustrating an injection unit and a clamping unit of an injection molding machine to which this invention is applicable.

DESCRIPTION OF THE PREFERRED EMBODIMENTS:

In order to facilitate an understanding of this invention, description will at first be made as regards a control system of a conventional injection molding machine.

Control of a clamping pressure has already been described in the preamble of the instant specification. Now, switching from a filling process to a holding process, namely, V-P switching will be taken into consideration. Judgement of a timing of V-P switching is based on various preselected values including a screw position in a heating cylinder, a resin filling time, and a hydraulic pressure of an injection cylinder for driving the screw. These preselected values are selected by an operator. The screw is moved from a resin measurement completion position to a V-P switching position to feed a melted resin material into a mold comprising a fixed mold and a movable mold. However, when the judgement of the timing of V-P switching is based on the screw position and the filling time as described above, fluctuation occurs in the amount of the melted resin material delivered by the above-mentioned movement of the screw if a density and a temperature of the melted resin material are nonuniform. This results in fluctuation of the amount of the melted resin material filled in the mold.

Alternatively, there is known a system of carrying out V-P switching with reference to the hydraulic pressure of the injection cylinder. In this system, however, it is impossible to control an accurate amount of the melted resin material because of various pressure losses in a transmission route from the hydraulic pressure of the injection cylinder to an internal pressure within the mold.

At any speed, selection of the timing of V-P switching is based on the experience of the operator. In addition, the timing of V-P switching is varied also in dependence upon the configuration of a molded product and the structure of the mold. Accordingly, it is extremely difficult to select an optimum timing for V-P switching.

Next, description will proceed to a countermeasure for preventing occurrence of flash in the holding process. Usually, the melted resin material is substantially completely filled in the mold immediately after the filling process is switched to the holding process. Accordingly, a force is applied to increase a opening between opposite parting surfaces of the fixed mold and the movable mold. Thus, a small mold opening is produced. If such force exceeds the clamping pressure, the mold opening is increased. This results in occurrence of flash. In this case, the operator increases the preselected clamping pressure or changes the preselected values defining the injection condition so that the injection pressure is not excessive.

In the system where the clamping pressure is kept constant during the injection process as described above, an excessive increase of the clamping pressure prevents escape of the air and the gas present in the mold and causes occurrence of the defects such as short shot, a weld mark, and burning, as described in the foregoing. In case where any change is to be made in the injection condition, the experience of the operator is again relied upon. Therefore, a long time is inevitably required to determine the condition. In addition, once an optimum condition for obtaining an excellent product is found, a defective product may possibly be produced because an optimum balance between injection and clamping will be often collapsed due to temperature variation of the melted resin material or the mold.

Furthermore, description will be made as regards an injection compression molding method. Typically, a driving source for injection compression is a hydraulic clamping mechanism or a hydraulic mechanism coupled to a movable platen provided with the movable mold. In either case, the timing of the start of injection compression is controlled with reference to a time duration from a filling process start point, a holding process start point, and a V-P switching point.

When the timing of the start of injection compression is too early, the melted resin material within the mold escapes outwardly through a gate of the mold. In addition, while a part of the melted resin material corresponding to a thin portion of the product in a cavity of the mold is fully solidified, another part of the melted resin material corresponding to a thick portion of the product moves towards the thin portion to result in occurrence of a sink mark in the thick portion. On the other hand, when the timing of the start of injection compression is too late, the thin portion has already been fully solidified so that compression is subjected to resistance and that the movement of the melted resin material becomes difficult. This results in difficulty in reduction of occurrence of the sink mark and in frequent occurrence of deformation due to residual strain. Under the circumstances, the experience of the operator is relied upon in order to find preselected values for optimum time control. This means that a long time is required to determine the condition.

Generally, an injection compression pattern is varied stepwise. In order to achieve an optimum injection compression pattern in accordance with the type of the resin material and the configuration of the mold, it is required to carry out multistage selection of the preselected values. Such multistage selection inevitably takes a long time. In addition, an actual behaviour of the injection compression pressure can not follow the preselected values which are varied stepwise. The actual behaviour often differs from an intended behaviour intended by the operator or is altered due to variation of an oil temperature in the hydraulic mechanism.

Now, description will be made as regards a first embodiment of this invention with reference to the drawing. Referring to FIG. 1, an injection unit and a clamping unit will be described. In the injection unit, a resin material is put into a hopper 11 and is supplied to a heating cylinder 12. The resin material is melted in the heating cylinder 12 while being kneaded and measured by a screw 13. The melted resin material is reserved in a forward area before the screw 13. The screw 13 is rotated by a rotation driving mechanism which is not shown in the figure. The screw 13 is also driven by a first hydraulic cylinder mechanism comprising an injection cylinder 14 and a piston 15 and is moved forward, namely, towards a mold. When the first hydraulic mechanism makes the screw 13 move towards the mold, the melted resin material reserved in the forward area before the screw 13 is delivered through a nozzle 16 to be filled within a cavity of the mold comprising a fixed mold 17 and a movable mold 18. In a filling process and a holding process, driving oil having a controlled flow speed or a controlled pressure flows into and flows out from an injection cylinder 14 through an inlet/outlet port 14-1.

On the other hand, the clamping unit is fixed to a frame which is not illustrated in the figure. Opposite to a fixed platen to which the fixed mold 17 is attached, a rear platen 22 is fixedly supported through four tie bars 23 (only two of them are illustrated in the figure). Behind the rear platen 22, a second hydraulic cylinder mechanism including a hydraulic cylinder 24 and a piston 25 is formed. The piston 25 is arranged in the hydraulic cylinder 24 fixed behind the rear platen 22. The piston 25 is coupled to a movable platen 26 to which the movable mold 18 is attached. The movable platen 26 is slidable along the tie bars 23 with the movement of the piston 25. Thus, when the driving oil is fed from an inlet/outlet port 24-1 to the hydraulic cylinder 24 through a pressure control valve which is not shown in the figure, the movable platen 26 is moved in a direction such that the mold is closed. At this time, the driving oil flows out from an inlet/outlet port 24-2. On the other hand, when the driving oil is fed from the inlet/outlet port 24-2 to the hydraulic cylinder 24, the movable platen 26 is moved in another direction such that the mold is opened. At this time, the driving oil flows out from the inlet/outlet port 24-1.

The hydraulic cylinder 24 is provided with a first pressure sensor 27 for detecting a hydraulic pressure. While the mold is closed, the first pressure sensor 27 detects, as a detected clamping pressure, a hydraulic pressure within the hydraulic cylinder 24 at the side of the inlet/outlet port 24-1 and produces a pressure detection signal representative of the detected clamping pressure. The clamping pressure is controlled by adjusting the pressure control valve in response to the pressure detection signal from the first pressure sensor 27. The fixed platen 21 and the movable platen 26 are provided with a distance sensor 28 for detecting a platen interval L. The distance sensor 28 detects a small mold opening between opposite parting surfaces of the fixed mold 17 and the movable mold 18. Herein, the platen interval means a total mold thickness or a partial mold thickness, including the mold opening which is a distance between the parting surfaces. The behaviour of the platen interval is substantially same as that of the mold opening.

Figure 2:
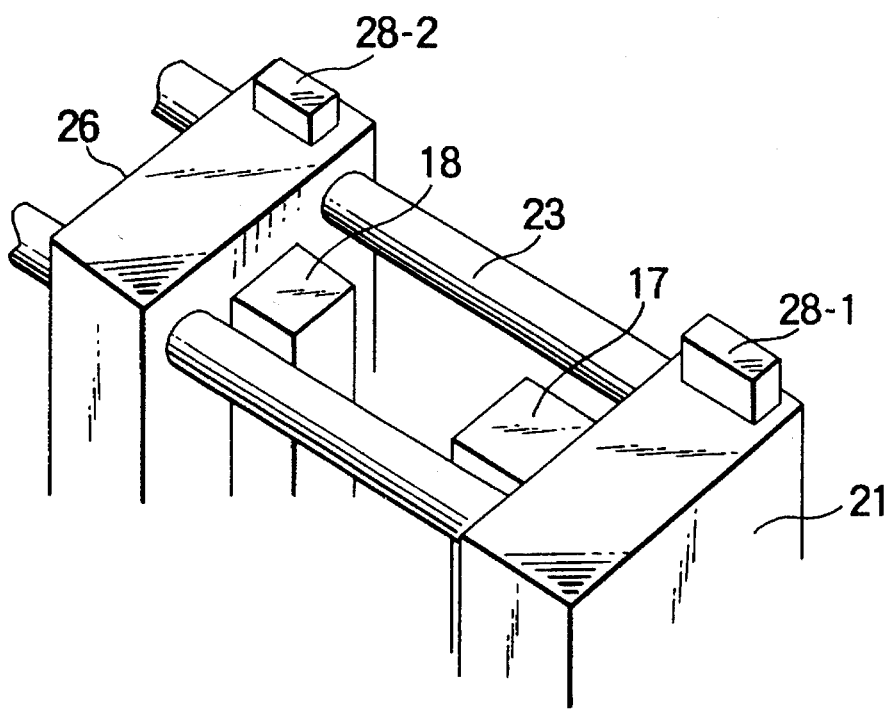
FIG. 2 is a view for describing an example of a distance sensor used in this invention.

Referring to FIG. 2, a distance sensor of a laser system comprises a laser head 28-1 formed on the fixed platen 21 for transmission and reception of a laser beam, and a reflector 28-2 formed on the movable platen 26 for reflection of the laser beam. The laser beam irradiated from the laser head 28-1 is reflected by the reflector 28-2 to be returned to the laser head 28-1. The laser head 28-1 comprises a calculating unit for calculating the platen interval L from a time period until the irradiated laser beam is returned after being reflected by the reflector 28-2. The laser head 28-1 transmits, to a control unit which will later be described, a distance detection signal indicative of the platen interval L thus calculated.

The above-mentioned distance sensor of a laser system has a long span of measurement up to a maximum mold opening. The laser head 28-1 and the reflector 28-2 are arranged not on the fixed mold 17 and the movable mold 18 but on the fixed platen 21 and the movable platen 26, respectively. Accordingly, adjustment of the distance sensor is unnecessary when the mold is exchanged for another mold.

Figure 3:
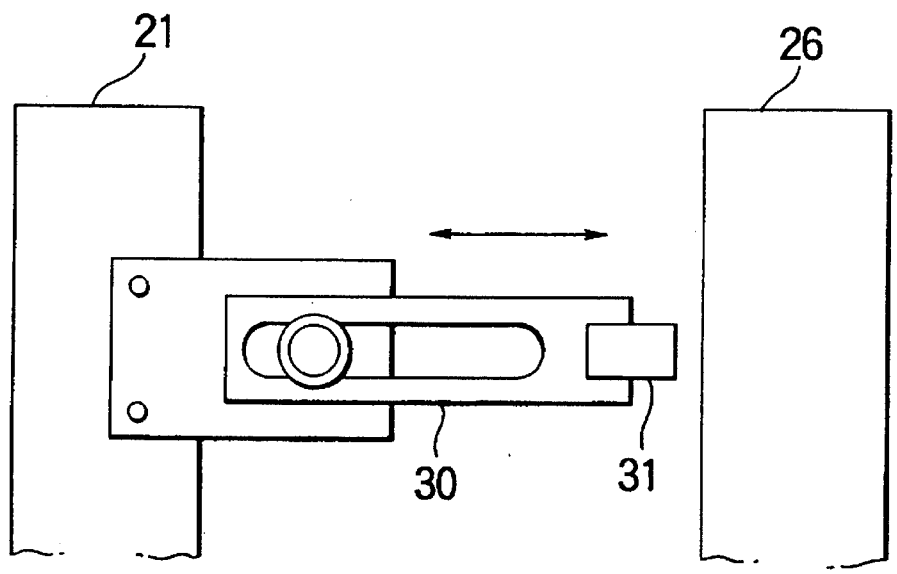
FIG. 3 is a view for describing another example of the distance sensor used in this invention.

Referring to FIG. 3, a distance sensor of an eddy current system comprises a mounting table 30 and a sensor portion 31 utilizing a known eddy current effect. The sensor portion 31 is mounted on the mounting table 30 to be opposite to the movable platen 26. The distance sensor of an eddy current system has a shorter span of measurement than that of the laser system illustrated in FIG. 2. However, since the sensor portion 31 is mounted on the mounting table 30 having a variable stroke, adjustment is very simple when the mold is exchanged for another mold. It is only necessary to adjust the stroke of the mounting table 30 so that the sensor portion 31 is present within the span of measurement while the mold is closed.

In either one of the above-mentioned systems, the distance sensor is attached not to the mold but to the fixed platen 21 and the movable platen 26. Thus, the mold is not required to have any special structure necessary to mount the distance sensor. Therefore, an arrangement structure of the distance sensor according to this invention is realized at a low cost as compared with a conventional structure in which the distance sensor is directly attached to the mold. In addition, use can also be made of an existing mold having no special mounting structure for the distance sensor. Therefore, an efficiency in exchange of the mold is improved and the cost of the mold can be reduced.

Figure 4:
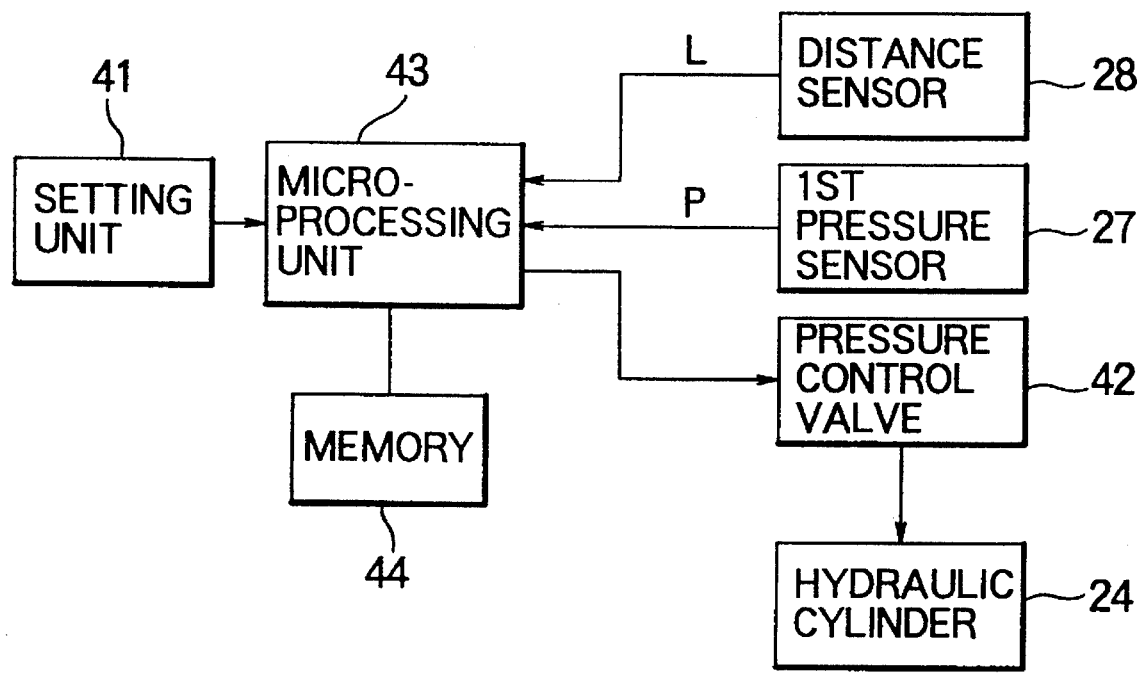
FIG. 4 is a schematic block diagram for describing a control section according to a first embodiment of this invention.

Referring to FIG. 4, description will now be made as regards a control section according to this invention. The control section comprises a setting unit. 41, a pressure control valve 42, a microprocessing unit 43, and a memory 44. The setting unit 41 is for entering preselected values including a preselected platen interval and a preselected clamping pressure to produce a setting signal indicative of the preselected values. The pressure control valve 42 is for controlling the hydraulic pressure of the hydraulic cylinder 24 (FIG. 1). The microprocessing unit 43 is responsive to the setting signal from the setting unit 41, the pressure detection signal from the first pressure sensor 27, and the distance detection signal from the distance sensor 28 and carries out sequence processing of the injection molding machine, generation of function patterns which will later be described, and generation of a command value supplied to the pressure control valve 42, and so on. The memory 44 is for memorizing the preselected values, including the preselected platen interval and the preselected clamping pressure, and detected values. The microprocessing unit 43 serves as a control unit.

Figure 5:
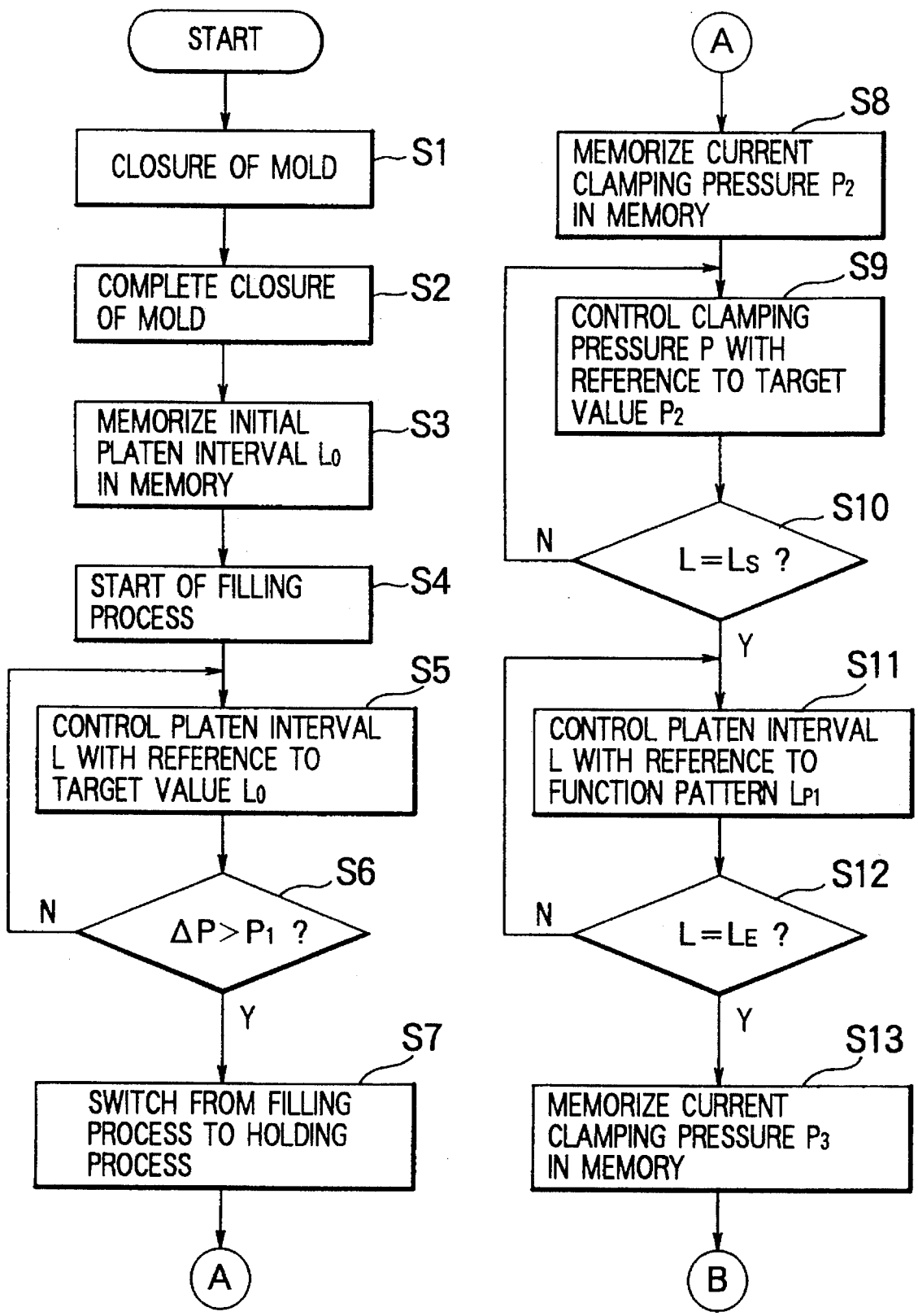
FIG. 5 is a flow chart for describing a first half of a control operation according to the first embodiment of this invention.
Figure 6:
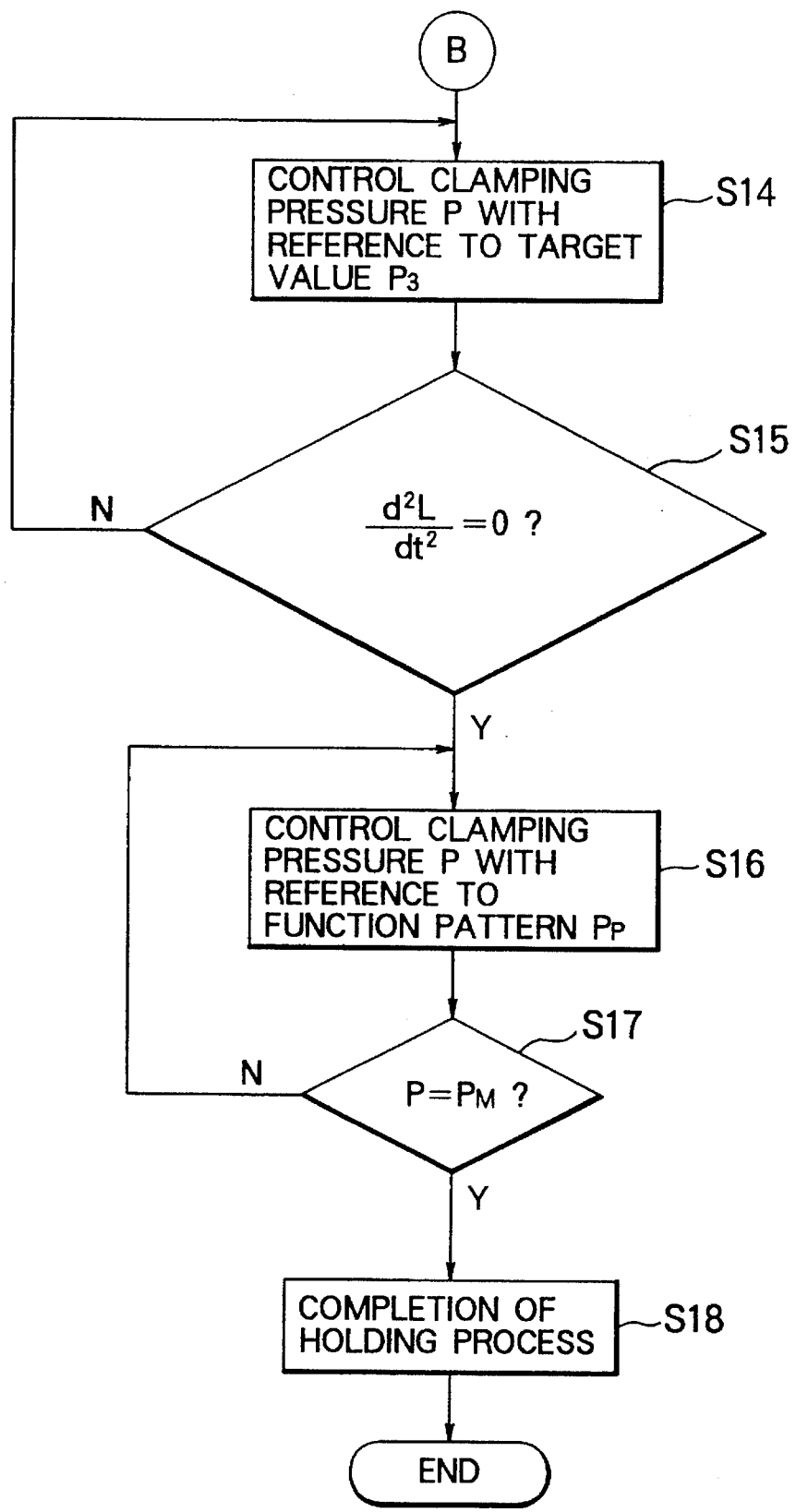
FIG. 6 is a flow chart for describing a second or latter half of the control operation according to the first embodiment of this invention.
Figure 7:
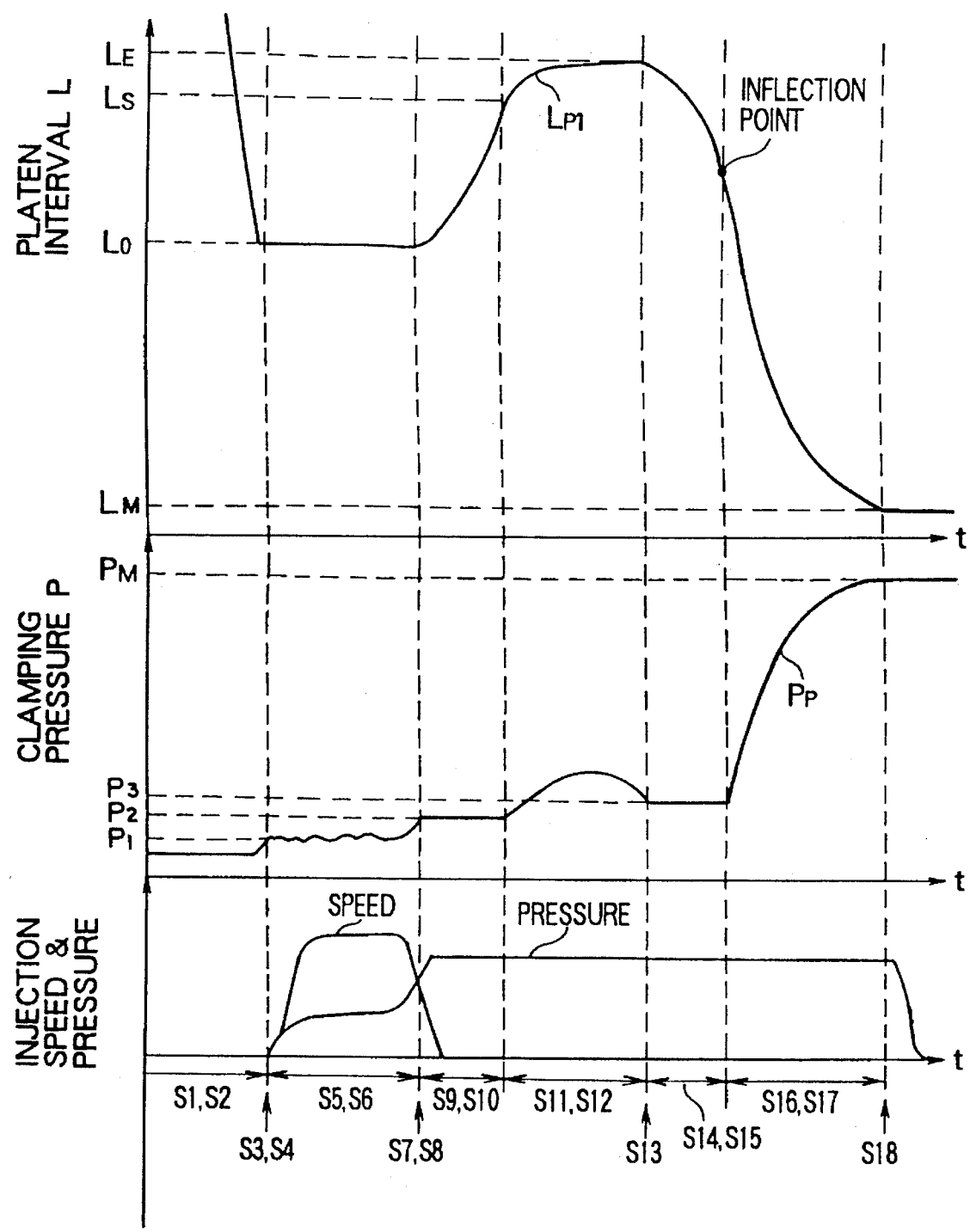
FIG. 7 is a graph showing variations of a platen interval, a clamping pressure, an injection speed, and an injection pressure during the control operation according to the first embodiment of this invention.

Referring to FIGS. 5 through 7 together with FIG. 4, description will proceed to a control operation executed by the control section illustrated in FIG. 4 from closure of the mold to completion of the holding process. The control operation will be described together with variation of the platen interval L, the clamping pressure P, and the injection speed, and the injection pressure.

In a stage S1, the mold is closed prior to the start of a molding operation. In a stage S2, the mold is closed according to a conventional practice and, from measurement of a position of the movable platen 26 or in response to the pressure detection signal produced by the first pressure sensor 27, judgement is made that the mold is closed. It is noted here that the fixed mold 17 and the movable mold 18 are subjected to no more than a minimum clamping pressure P1 (FIG. 7) required to close them.

In a stage S3, the microprocessing unit 43 makes the memory 44 memorize, as an initial platen interval L0 (FIG. 7), the platen interval L at the time instant when the mold is closed. In a stage S4, the filling process is started. Once the filling process is started, the microprocessing unit 43 reads the initial platen interval L0 from the memory 44 in a stage S5. The pressure control valve 42 is controlled by the microprocessing unit 43 in response to the platen interval L detected by the distance sensor 28 so as to maintain the initial platen interval L0 as a target value. As a result, the clamping pressure P is varied in response to the platen interval L, as illustrated in FIG. 7. The stage S5 may be called a first step.

The above-mentioned control operation considers that, in the state where the melted resin is completely spread in the mold, the melted resin may reach an exit for discharging the air or the gas present within the mold so that the air or the gas is confined in the mold. The above-mentioned control operation is effective in discharging the air or the gas before the melted resin is completely spread in the mold. Generally, it is preferable to discharge the air or the gas after achievement of 70 to 80% of the overall injection stroke required to completely fill the melted resin in the mold. By such a control operation, discharge of the air or the gas is started during spreading of the melted resin before it is completely filled in the mold. Furthermore, the minimum mold opening required to discharge the air or the gas need not be selected by the operator and is automatically controlled by the microprocessing unit 43.

Thus, in the first step, namely, the stage S5, according to this invention, the melted resin material is filled in the mold by controlling the clamping pressure P so as to keep the current platen interval at the initial platen interval L0. As a result, the mold is subjected to no more than a minimum clamping pressure required to close the mold. Accordingly, the air remaining in the mold or the gas generated from the melted resin is easily discharged. Furthermore, since the initial platen interval L0 is selected as a target value, the parting surfaces of the fixed mold 17 and the movable mold 18 are never opened any further even if subjected to an internal pressure accompanying the resin filling operation. This means that occurrence of flash is suppressed in the filling process. When the clamping pressure P is appropriately varied in response to the internal pressure resulting from the resin filling operation as described above, the movable mold 18 is pressed against the fixed mold 17 in a so-called soft-touched condition. As a result, the air or the gas is easily discharged from the mold and the occurrence of flash is avoided.

In a stage S6, the microprocessing unit 43 monitors a slope or a differential value $\Delta P$ of an increasing curve of the clamping pressure P detected by the first pressure sensor 27 and judges whether or not the differential value $\Delta P$ exceeds a predetermined level or value $\Delta P1$. When the differential value $\Delta P$ does not exceed the predetermined value $\Delta P1$, the operation returns to the stage S5. When the differential value $\Delta P$ exceeds the predetermined value $\Delta P1$, the operation proceeds to a stage S7.

Such judgement is required because of the following reason. Specifically, when the resin is gradually filled in the mold with the progress of the resin filling operation, the mold is going to be opened. Against such motion of the mold, the microprocessing unit 43 increases the command value supplied to the pressure control valve 42 to thereby increase the clamping pressure P in order to maintain the initial platen interval L0. The stage S6 may be called a second step.

Figure 8:
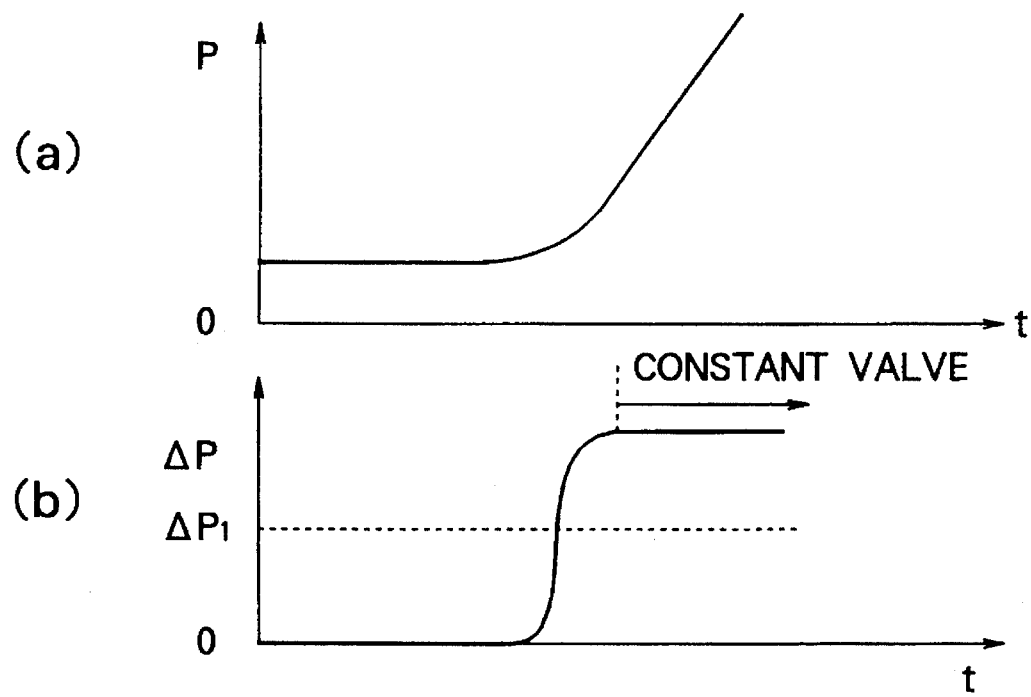
FIGS. 8(a) and 8(b) are graphs showing variations of the clamping pressure and its differential value to explain a timing of V-P switching according to this invention.

Referring to FIG. 8, description will be made as regards behaviours of the clamping pressure P and the differential value $\Delta P$ indicating the variation of the clamping pressure P. Herein, when the differential value $\Delta P$ exceeds the predetermined value $\Delta P1$, the stage S6 proceeds to the stage S7 where switching from the filling process to the holding process, namely, V-P switching is carried out. The stage S7 may be called a third step.

According to the judging operation in the second step described above, it is possible to accurately detect that the mold is completely filled with the melted resin material. In addition, according to the third step, ideal V-P switching can be carried out without setting any particular time period by the use of a timer as practiced in prior art.

As will be clearly understood from FIG. 8, judgement of the timing of V-P switching with reference to the differential value $\Delta P$ of the clamping pressure P may be carried out by detecting whether or not an increase of the differential value $\Delta P$ is stopped and reaches a constant value. Not the clamping pressure P itself but the differential value $\Delta P$ is used in the judging operation in the second step because of the reason which will presently be described. Specifically, when the injection condition is changed, the clamping pressure P is varied. Accordingly, it is difficult by the use of the clamping pressure P to carry out the above-mentioned judging operation for V-P switching. On the other hand, when the differential value $\Delta P$ is used, the behaviour of the differential value $\Delta P$ always follows the curve illustrated in FIG. 8(b), irrespective of the injection condition. Thus, the above-mentioned judgement of the timing for V-P switching is easily carried out. In addition, such judgement of the timing for V-P switching by the use of the differential value $\Delta P$ is not affected by variation of the temperature of the driving oil for the hydraulic cylinder mechanism and the temperature of the mold.

Next, after the filling process is switched to the holding process in the third step, namely, the stage S7, the operation proceeds to a stage S8. In the stage S8, the microprocessing unit 43 makes the memory 44 memorize a clamping pressure P2 (FIG. 7) at the time of switching. Subsequently, in a stage S9, the micro-processing unit 43 reads, as a target value, the clamping pressure P2 memorized in the memory 44 and controls the pressure control valve 42 to keep the clamping pressure P at the target value P2. In this state, the melted resin is substantially completely filled in the mold. Since the melted resin is further filled in the mold by the holding operation, the pressure within the mold is increased so that the mold is going to be opened. Against such motion of the mold, the clamping pressure is maintained at the target value P2. In this event, the mold is intentionally opened to alleviate the drastic variation of flow of the melted resin filled in the mold. Thus, a so-called cushion effect is obtained which avoids an adverse affect on the molded product, such as distortion. The stages S8 and S9 may collectively be called a fourth step.

In the fourth step, the platen interval L is increased because the mold is going to open as described above. In a stage S10, the microprocessing unit 43 judges whether or not the platen interval L is coincident with a restriction start platen interval LS at which restriction of the platen interval is started. Upon incoincidence, the operation returns to the stage S9. Upon coincidence, the operation proceeds to a stage S11. The stage S10 may be called a fifth step. The restriction start platen interval LS may be called a first predetermined value.

In the stage S11, the microprocessing unit 43 produces a function pattern LP1 having a smooth configuration when the platen interval L is coincident with the restriction start platen interval LS. The function pattern LP1 lasts until the platen interval L is coincident with a restriction end platen interval LE. With reference to a target value defined by the function pattern LP1, the microprocessing unit 43 controls the pressure control valve 42 to adjust the clamping pressure P so that the platen interval L follows the function pattern LP1. The stage S11 may be called a sixth step. The restriction end platen interval LE may be called a second predetermined value. The function pattern LP1 may be called a predetermined variation pattern.

Figure 9:
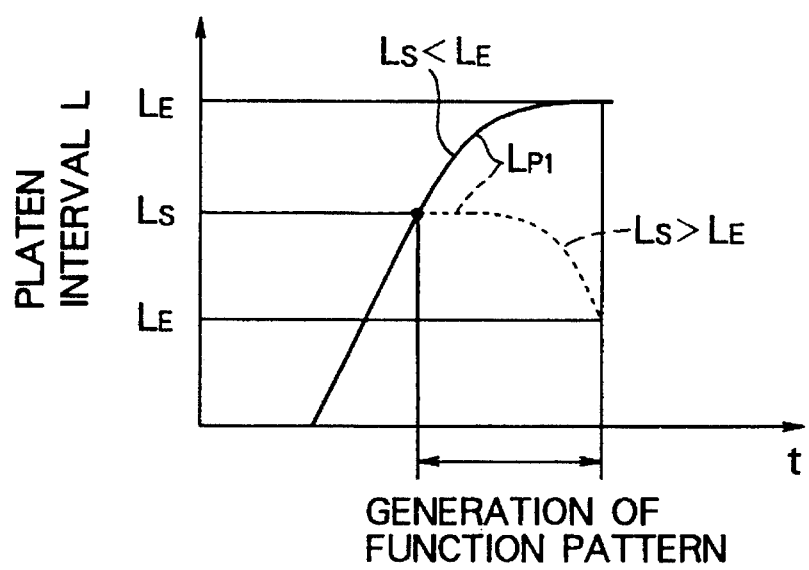
FIG. 9 is a graph showing an example of a function pattern for defining the platen interval according to this invention.

The function pattern LP1 may be, for example, a linear delay function when the restriction end platen interval LE is greater than the restriction start platen interval LS, as depicted by a solid line in FIG. 9. On the other hand, when the restriction end platen interval LE is smaller than the restriction start platen interval LS, an exponential function may be used, as depicted by a dashed line in FIG. 9. Thus, in the stage S11, it is possible by setting the appropriate pattern to restrict the maximum platen interval free from occurrence of flash. Thus, occurrence of flash is avoided. The platen interval is controlled in the smooth variation pattern so as to suppress drastic variation of the resin flow in the mold. Therefore, it is possible to reduce a pressure difference in the mold between a close area close to the gate and a remote area remote from the gate. This prevents occurrence of various defects such as a sink mark and warp.

Furthermore, depending upon selection of the restriction start platen interval LS, the restriction end platen interval LE, and a time constant T1 defining the function pattern LP1, the configuration of the function pattern LP1 can be desiredly changed. This means that the operator can select an optimum condition in dependence upon the thickness of the molded product and the type of the resin material (the viscosity, the temperature characteristic, the solidifying rate, and so on). For example, since the resin material has compressibility, the resin material continues to be filled after the platen interval L reaches the restriction start platen interval LS, in case when the molded product is thick. In view of the above, the mold is gradually opened by selecting a condition that the restriction end platen interval LE is greater than the restriction start platen interval LS. On the contrary, when the molded product is thin, only a little amount of the resin material is filled after the platen interval L reaches the restriction start platen interval LS. In this event, the mold is gradually closed by selecting a condition that the restriction end platen interval LE is smaller than the restriction start platen interval LS.

The memory 44 can memorize, as fixed values, a plurality of the preselected values for $\Delta L$ (=LS−LE) and the time constant T1. In this event, the operator sets the restriction start platen interval LS and selects the optimum values among the plurality of the preselected values to obtain an optimum pattern. This means that the microprocessing unit 43 can select the optimum pattern from a plurality of function patterns.

At any rate, according to the fourth through the sixth steps of this invention, the clamping pressure is kept constant at the clamping pressure P2 which is detected immediately after V-P switching. Thus, the cushion effect is obtained. In addition, the platen interval is controlled under restriction at the maximum value free from flash. It is thus possible to avoid occurrence of various defects such as flash, a sink mark, and warp.

In a stage S12, the microprocessing unit 43 judges whether or not the platen interval L is coincident with the restriction end platen interval LE defined by the function pattern LP1. If the platen interval L is incoincident with the restriction end platen interval LE, the operation returns to the stage S11. Upon coincidence, generation of the function pattern LP1 is finished and the operation proceeds to a stage S13. The stage S12 may be called a seventh step. In the stage S13, the microprocessing unit 43 detects a clamping pressure P3 (FIG. 7) at the time instant of the end of generation of the function pattern LP1 and makes the memory 44 memorize the clamping pressure P3. In a stage S14, the microprocessing unit 43 reads, as a target value, the clamping pressure P3 memorized in the memory 44. The microprocessing unit 43 further controls the pressure control valve 42 to maintain the clamping pressure at the target value P3. The stage S14 may be called an eighth step.

In the stage S14, with the progress of the holding process, the fill amount of the melted resin material filled in the mold becomes small because the gate of the mold is gradually sealed. In addition, due to shrinkage of the melted resin material cooled and solidified, the platen interval L is reduced. In a stage S15, the microprocessing unit 43 monitors a second-order differential value $d^2L/dt^2$ of the platen interval L to detect an inflection point of the variation curve of the platen interval L, namely, the minimum value of the differential value $\Delta L$ of the platen interval L. When the microprocessing unit 43 does not detect the minimum value of the differential value L, the operation returns to the stage S14. When the minimum value of the differential value $\Delta L$ is detected, the operation proceeds to a stage S16 where the clamping pressure is increased to start injection compression.

Figure 10:
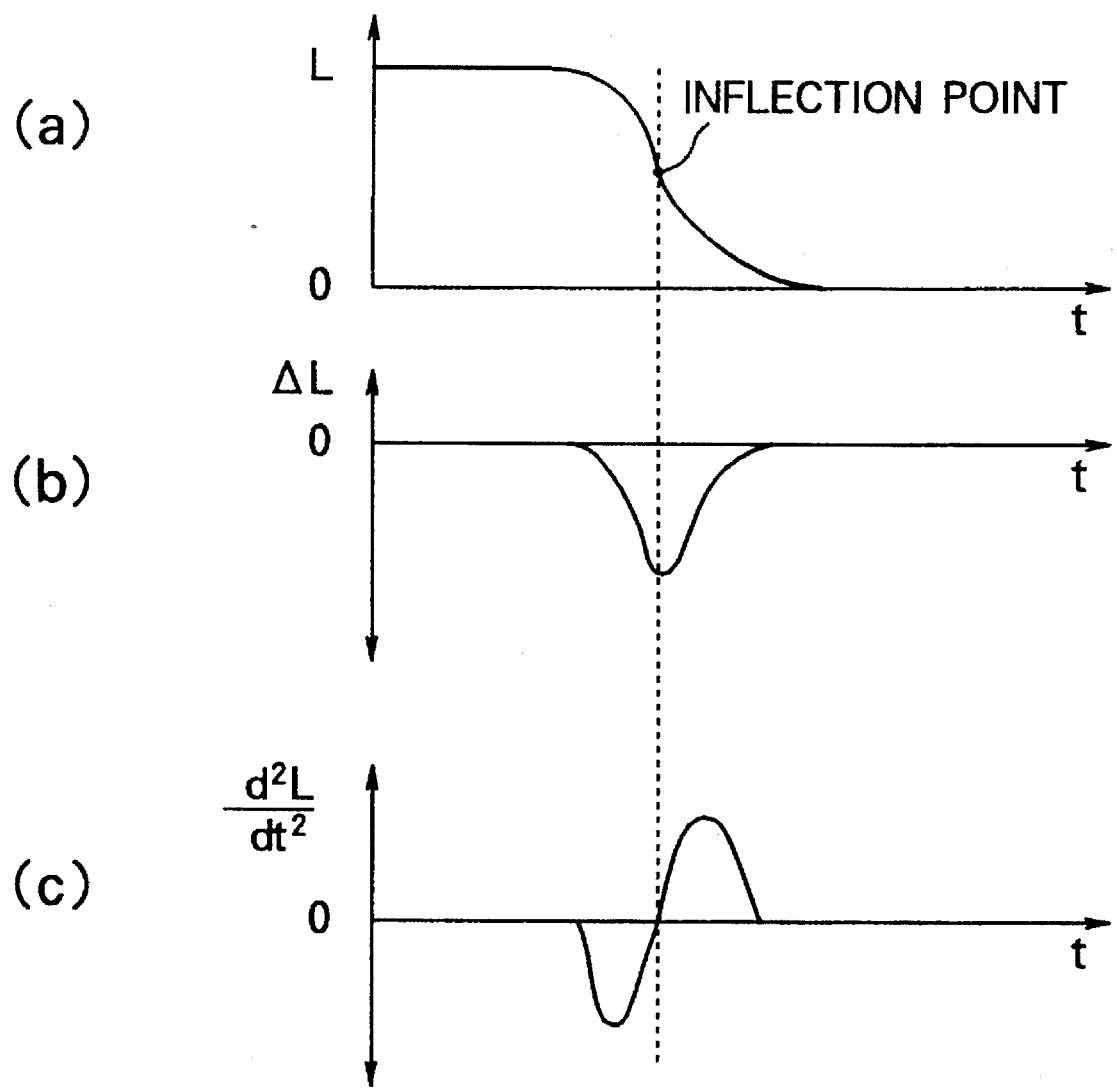
FIGS. 10(a), 10(b), and 10(c) are graphs for describing a principle of detecting an inflection point of variation of the platen interval according to this invention.

Referring to FIG. 10, the inflection point of the variation curve of the platen interval L can be found by detecting that the second-order differential value $d^2L/dt^2$ of the platen interval L is equal to zero. The stage S15 may be called a ninth step.

Herein, the optimum timing of the start of the injection compression will be mentioned. It is noted that the object of the injection compression is to compensate for shrinkage of the melted resin material of the molded product by the clamping unit. In this case, when the timing of the start of injection compression is too early, the temperature of the melted resin material is still high. This results in occurrence of backflow of the melted resin material from the gate of the mold to the nozzle, and in occurrence of a sink mark due to the movement of the melted resin material in the mold. Thus, the effect by injection compression can not be expected. On the other hand, when the timing of the start of injection compression is too late, the surface of the molded product in the mold is solidified so that a uniform pressure can not be applied to the entire molded product in the mold. Thus, when the compression force is small, the compression force can not be transmitted to a portion which is not yet solidified. When the compression force is large, the compression force is excessively applied to a portion which is being solidified. This results in occurrence of distortion.

The stages S14 and S15 are based on the knowledge which will presently be described. Usually, the force to open the mold is exerted by the melted resin material injected from the heating cylinder into the cavity of the mold. Due to such a force, a little opening (mold opening) $\Delta d$ is present between the parting surfaces of the mold after the mold is filled with the melted resin material. After the mold is filled with the melted resin material, the compression process proceeds to the shrinkage process. At this time, the internal pressure within the cavity is drastically increased and then gradually decreased unless the injection pressure and the clamping pressure are not drastically changed. The internal pressure within the cavity is greatly decreased when the melted resin material corresponding to the thin portion rapidly cooled is solidified and shrunk to attract the melted resin material corresponding to the thick portion gradually cooled. Thus, a decreasing ratio of the mold opening Δd correlated with the internal pressure within the cavity becomes great. In other words, the inflection point also appears in a characteristic curve representative of the relationship between the time and the mold opening Δd. The similar behaviour is observed in the platen interval L also.

The present inventors have found that, in view of the internal stress, the transferability, and the configuration of the molded product, it is most effective to start injection compression at the point exhibiting a greatest progress in shrinkage of the melted resin material. A particular point showing the maximum decreasing ratio of the platen interval L, namely, the inflection point, is a timing showing a greatest progress in shrinkage of the melted resin material during the holding process. From the above, it is possible by detecting the inflection point to automatically find the optimum timing of the start of injection compression.

Taking the above into consideration, in the stage S15, the clamping pressure is increased from the inflection point to reduce the mold opening Δd. The internal pressure within the cavity is increased and rendered uniform. Thus, occurrence of a local sink mark is avoided.

As described above, in the eighth and the ninth steps of this invention, the injection compression is started to increase the clamping pressure, at the time instant when the decreasing ratio of the platen interval L with respect to time becomes maximum after the platen interval L reaches the maximum value. Under such control, the timing of increasing the clamping pressure can automatically be determined and occurrence of a sink mark is most effectively reduced.

A specific example of the molded product will be mentioned. When the clamping force of 75 tons was applied and injection and holding processes were carried out until occurrence of flash was observed. At this time, the sink mark of about 40 μm was produced. On the other hand, according to this invention, occurrence of the sink mark was remarkably suppressed down to 10 μm with a half injection/holding pressure.

In a stage S16, the microprocessing unit 43 generates a linear delay function pattern Pp which increases from the current clamping pressure P3 to a predetermined maximum clamping pressure PM as a target value. The stage S16 may be called a tenth step. The microprocessing unit 43 controls the pressure control valve 42 so that the clamping pressure follows the linear delay function pattern Pp. The linear delay function pattern Pp may be called a predetermined ascending pattern and can be desiredly set when the operator changes a time constant T2 defining the pattern, in the manner similar to the function pattern LP1 described above. It is noted that the memory 44 can memorize, as fixed values, a plurality of preselected values for the time constant T2. To obtain an optimum pattern, the operator selects a particular one among those preselected values in dependence upon the solidifying rate of the melted resin material and the configuration of the molded product. Alternatively, the linear delay function pattern Pp may be replaced by a simple function such as a linear function, in dependence upon the processing ability of the microprocessing unit 43.

In a stage S17, the microprocessing unit 43 monitors whether or not the clamping pressure P is coincident with the predetermined maximum clamping pressure PM defined by the linear delay function Pp. Upon incoincidence, the operation returns to the stage S16. Upon coincidence, the operation proceeds to a stage S18 where the holding process is brought to an end. The melted resin material in the mold is progressively cooled and solidified after around the inflection point in the stage S15. At the time instant when the clamping pressure P is coincident with the predetermined maximum clamping pressure PM, the gate of the mold is already sealed and therefore the holding pressure need not be applied any longer. Thus, such time instant can be a condition for completion of the holding process.

As described, in injection compression following the function pattern Pp according to this invention, the clamping pressure is controlled to be varied along the smooth ascending pattern which can be readily followed by the driving source. Shrinkage of the melted resin material cooled and solidified is ideally compensated by the compression operation. In addition, the ascending pattern can be desiredly modified in dependence upon the configuration of the molded product and the solidifying rate of the melted resin material. Determination of an endpoint of the ascending pattern, namely, completion of the holding process can automatically be carried out.

In the manner described above, one molding cycle is completed.

Figure 11:
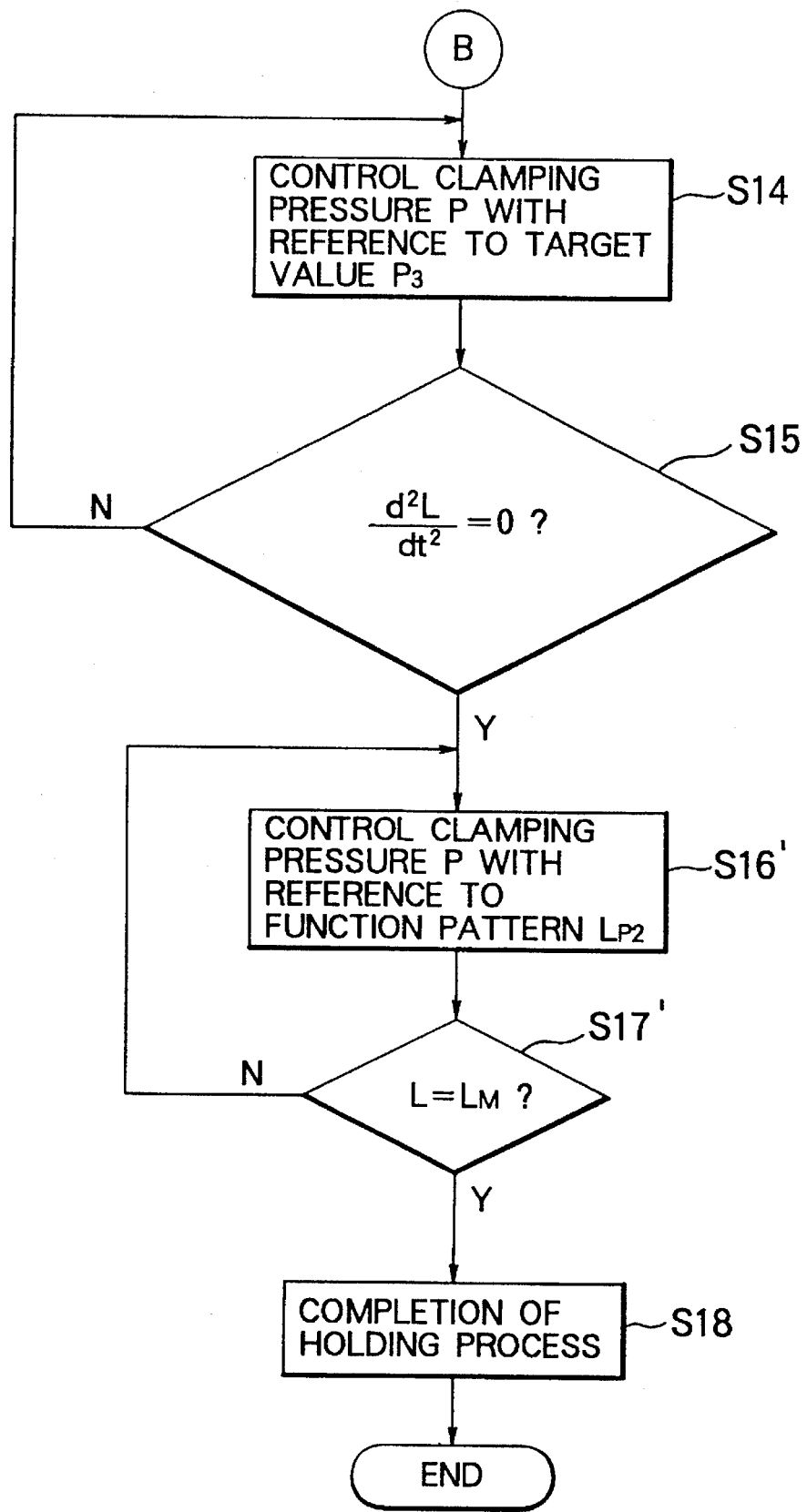
FIG. 11 is a flow chart for describing a latter half of a control operation according to a second embodiment of this invention.
Figure 12:
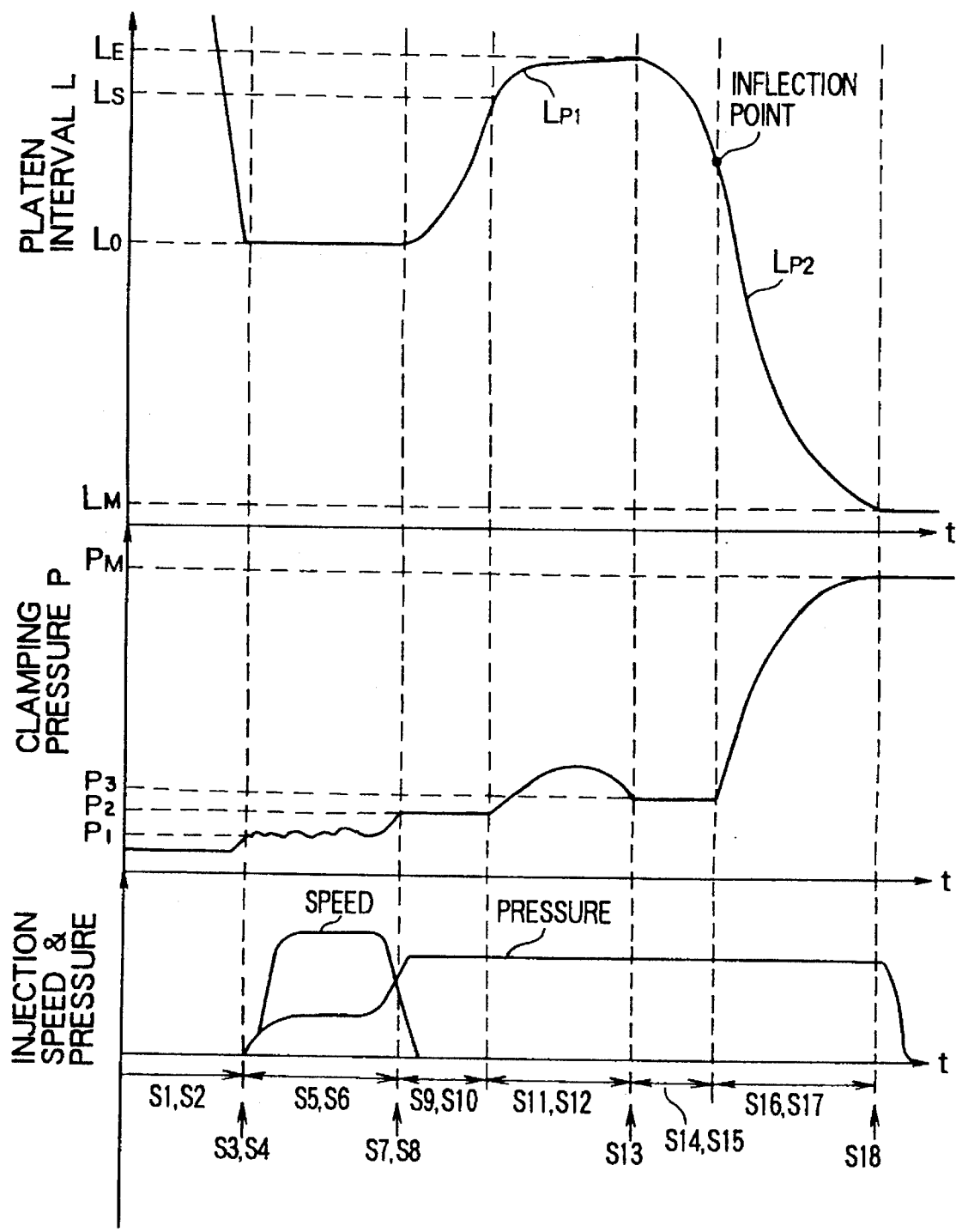
FIG. 12 is a graph showing variations of a platen interval, a clamping pressure, an injection speed, and an injection pressure during the control operation according to the second embodiment of this invention.

Referring to FIGS. 11 and 12, the second embodiment of this invention will be described. In FIG. 11, the control operation is similar to that described in conjunction with FIGS. 5 and 6 except that the stages S16 and S17 in FIG. 6 are replaced by stages S16' and S17'.

The stage S16' characterizing this invention follows the stage S15 described in conjunction with FIG. 6. In the stage S16', the microprocessing unit 43 generates a linear delay function pattern LP2 (FIG. 12) which decreases from the current platen interval to a predetermined minimum platen interval LM as a target value. The microprocessing unit 43 controls the pressure control valve 42 so that the platen interval L follows the linear delay function pattern LP2. The linear delay function pattern LP2 may be called a predetermined descending pattern and, in the manner similar to the linear delay function pattern LP1, can be desiredly set when the operator changes a time constant T3 defining the function pattern. Alternatively, the memory 44 may memorize, as fixed values, a plurality of preselected values for the time constant T3. To obtain an optimum pattern, the operator may select a particular one among those preselected values in dependence upon the solidifying rate of the melted resin material and the configuration of the molded product. Alternatively, the linear delay function pattern LP2 may be replaced by a simple function such as a linear function, in dependence upon the processing ability of the microprocessing unit 43.

As described, in injection compression according to this invention, the clamping pressure P is controlled to be varied along the smooth ascending pattern which can be readily followed by the driving source. Shrinkage of the melted resin material cooled and solidified is ideally compensated by the compression operation.

In the stage S17', the microprocessing unit 43 monitors whether or not the platen interval L is coincident with the predetermined minimum platen interval LM defined by the linear delay function pattern LP2. Upon coincidence, the operation proceeds to the stage S18 where the holding process is brought to an end. The melted resin material in the mold is progressively cooled and solidified after around the inflection point in the stage S15. At the time instant when the platen interval according to the linear delay function pattern LP2 is coincident with the predetermined minimum platen interval LM, the gate of the mold is already sealed and therefore the holding pressure need not be applied any longer. Thus, such time instant can be a condition for completion of the holding process. The stages S16' and S17' may collectively be called an eleventh step.

Figure 13:
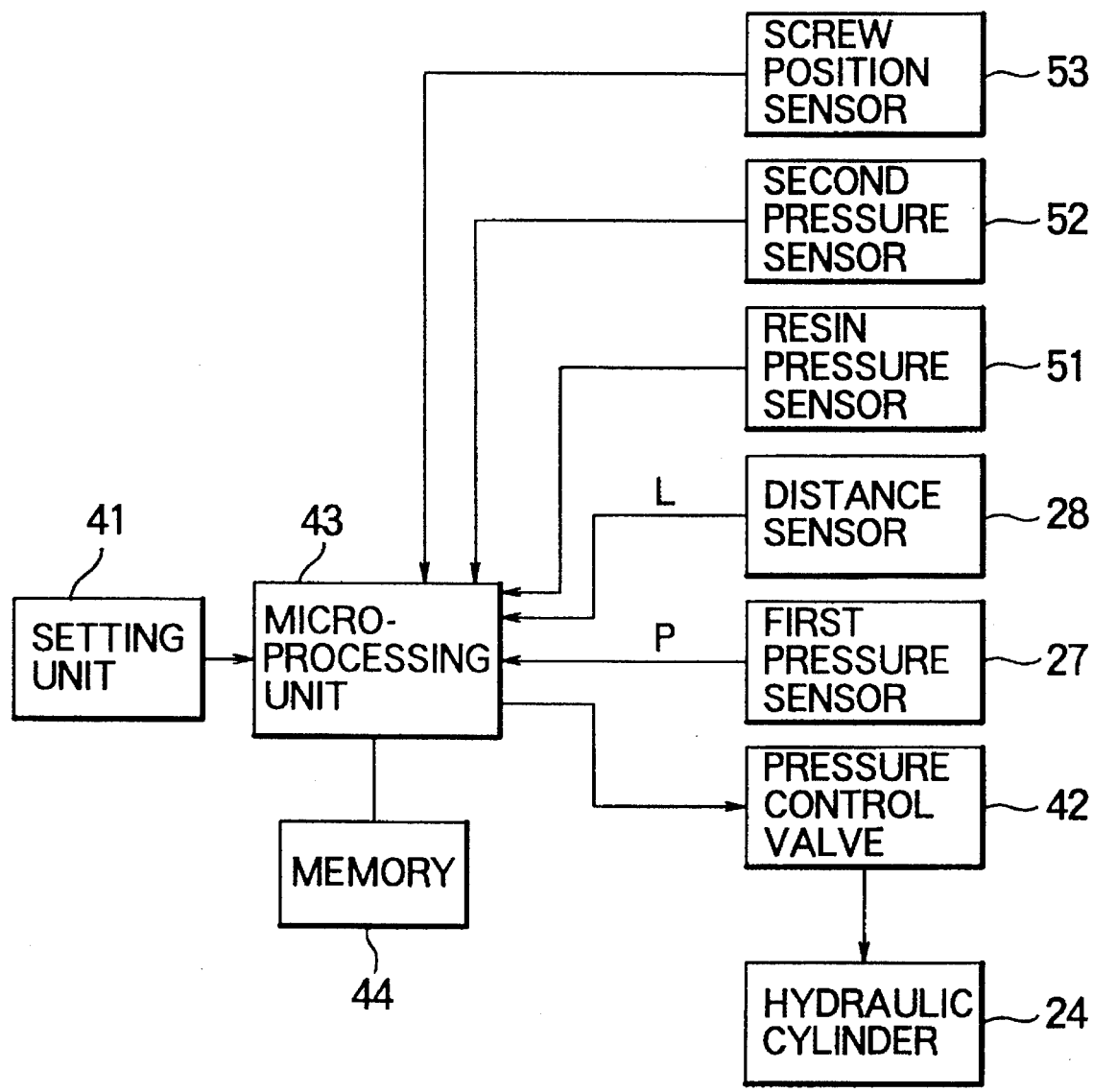
FIG. 13 is a schematic block diagram for describing a control section according to a third embodiment of this invention.

Referring to FIG. 13, description will proceed to a third embodiment of this invention. In FIG. 13, a control section according to the third embodiment of this invention is similar to that illustrated in FIG. 4 except the addition of a resin pressure sensor 51, a second pressure sensor 52, and a screw position sensor 53. The resin pressure sensor 51 is arranged either in the nozzle 16 (FIG. 1) or the mold and detects a resin pressure within the nozzle 16 or the mold to produce a detection signal representative of the detected resin pressure. The detection signal is delivered to the microprocessing unit 43. The second pressure sensor 52 is arranged in the injection cylinder 14 (FIG. 1) and detects a hydraulic pressure within the injection cylinder 14 to produce a detection signal representative of the detected hydraulic pressure, which is supplied to the microprocessing unit 43. The screw position sensor 53 is arranged on the screw 13 (FIG. 1) or a driving section therefor and detects a screw position to produce a detection signal representative of the detected screw position, which is delivered to the microprocessing unit 43. In this embodiment, the microprocessing unit 43 also has a time monitoring function by a timer.

Figure 14:
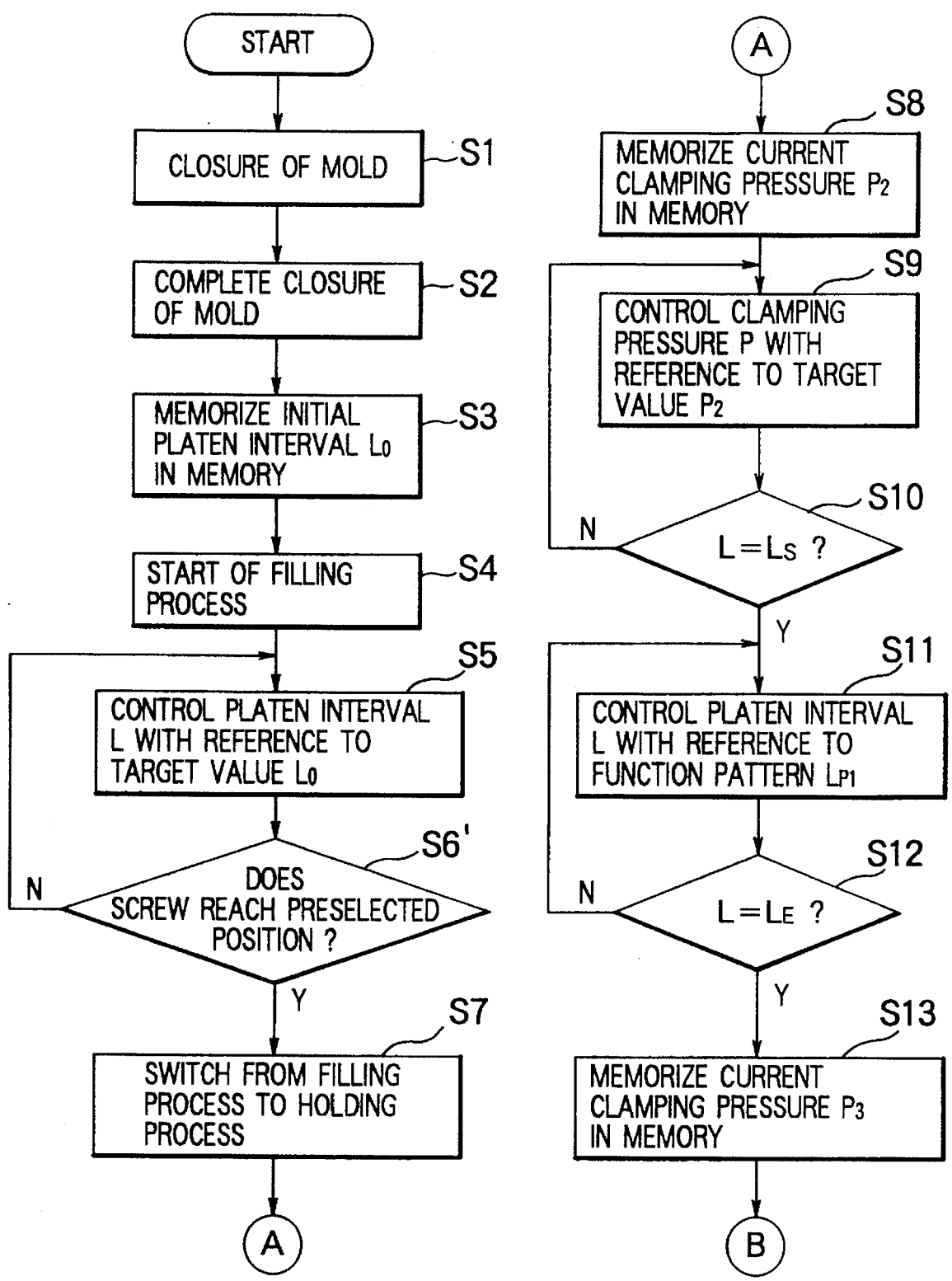
FIG. 14 is a flow chart for describing a first half of a control operation according to the third embodiment of this invention.
Figure 15:
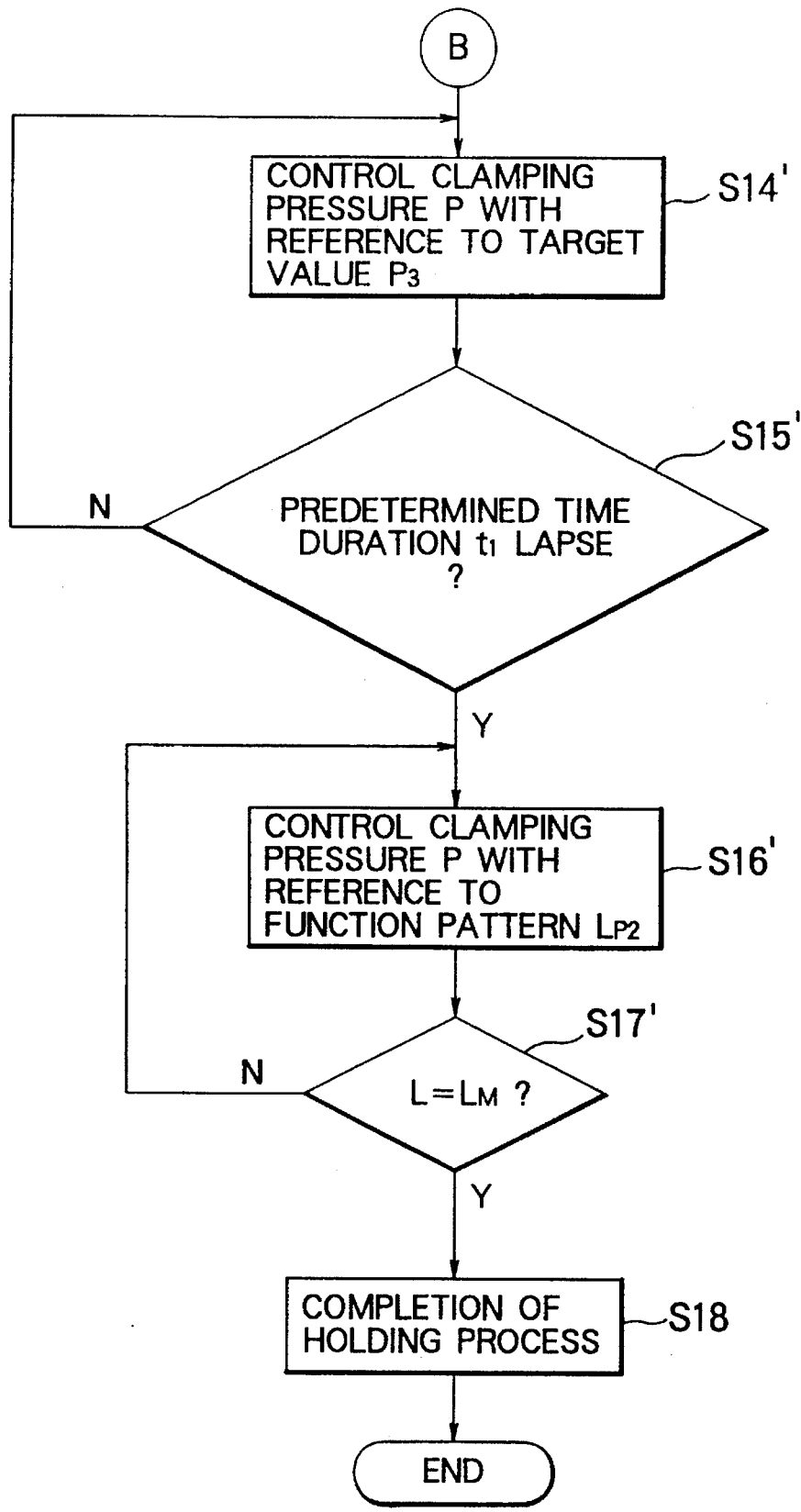
FIG. 15 is a flow chart for describing a latter half of the control operation according to the third embodiment of this invention.
Figure 16:
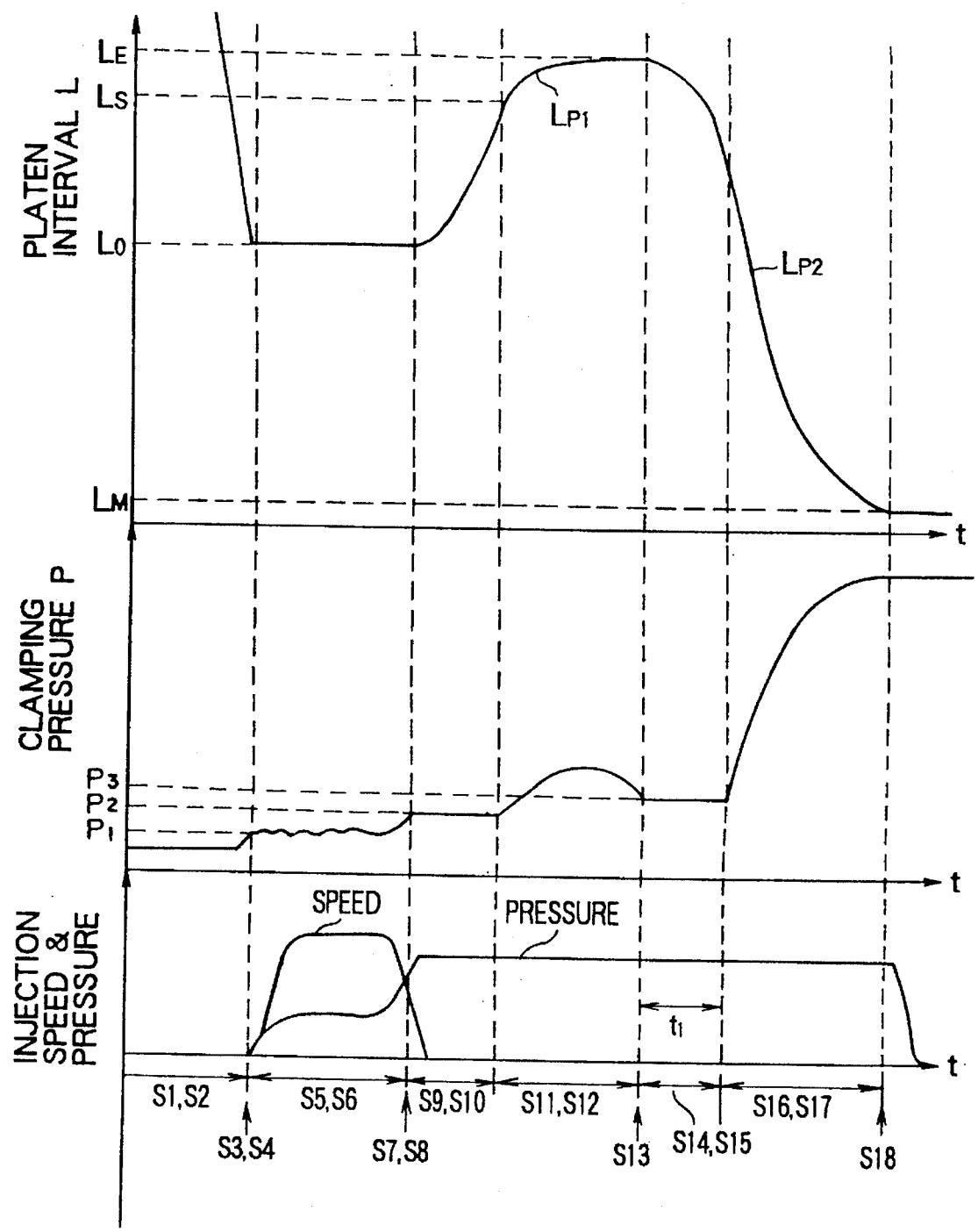
FIG. 16 is a graph showing variations of a platen interval, a clamping pressure, an injection speed, and an injection pressure during the control operation according to the third embodiment of this invention.

Referring to FIGS. 14 through 16, description will be made as regards a control operation by the third embodiment of this invention. In FIGS. 14 and 15, the control operation of this embodiment is similar to that illustrated in FIGS. 5 and 6 except that the stages S6 and S14 through S17 are replaced by stages S', S14' through S17', respectively.

In the stage S1, the mold is closed prior to the start of a molding operation. In the stage S2, the mold is closed according to a conventional practice and, from measurement of a position of the movable platen 26 or in response to the detection signal produced by the pressure sensor 27, judgement is made that the mold is closed.

In the stage S3, the microprocessing unit 43 makes the memory 44 memorize, as the initial platen interval L0, the platen interval L at the time instant when the mold is closed. In the stage S4, the resin filling process is started. Once the filling process is started, the microprocessing unit 43 reads the initial platen interval L0 from the memory 44 in the stage S5. The microprocessing unit 43 controls the pressure control valve 42 in response to the platen interval L detected by the distance sensor 28 so as to maintain the initial platen interval L0 as a target value. As a result, the clamping pressure P is varied in response to the platen interval L, as illustrated in FIG. 16.

In the stage S6', the microprocessing unit 43 monitors the detection signal from the screw position sensor 53 and judges whether or not the screw is moved to a preselected position. When the screw is not moved to the preselected position, the operation returns to the stage S5. When the screw moves to the preselected position, the operation proceeds to the stage S7 where V-P switching is carried out. The stage S6' may be called a twelfth step. The stage S7 may be called a thirteenth step.

V-P switching operation in the stage S7 may be carried out in the microprocessing unit 43 by monitoring the detection signal of the resin pressure sensor 51 or the second pressure sensor 52 described above. Specifically, the microprocessing unit 43 judges whether or not the resin pressure in the nozzle 16 or the mold reaches a predetermined value after the filling process is started. When the predetermined value is reached, V-P switching is carried out. This judging operation may be called a twenty-first step.

Separately from the twenty-first step, the microprocessing unit 43 may judge whether or not the hydraulic pressure in the injection cylinder 14 is increased to a predetermined hydraulic pressure. When the predetermined hydraulic pressure is reached, V-P switching is carried out. Such judging operation may be called a twenty-second step. Furthermore, utilizing the time monitoring function by the timer of the microprocessing unit 43, V-P switching can be carried out when a predetermined time duration lapses from the start of the filling process. Such operation may be called a twenty-third step.

Next, after the filling process is switched to the holding process in the thirteenth step, namely, the stage S7, the microprocessing unit 43 makes the memory 44 memorize, in the stage S8, the clamping pressure P2 at the time instant of switching. Subsequently in the stage S9, the microprocessing unit 43 reads the memorized clamping pressure P2 as a target value and controls the pressure control valve 42 so that the clamping pressure P is maintained at the target value P2. The stages S8 and S9 may collectively be called a fourteenth step.

In the stage S10, the microprocessing unit 43 judges whether or not the platen interval L is coincident with the restriction start platen interval LS. Upon incoincidence, the operation returns to the stage S9. Upon coincidence, the operation proceeds to the stage S11. The stage S10 may be called a fifteenth step.

In the stage S11, the microprocessing unit 43 generates a function pattern LP1 (FIG. 9) having a smooth configuration at the time instant when the platen interval L is coincident with the restriction start platen interval LS. The function pattern LP1 lasts until the platen interval L is coincident with the restriction end platen interval LE. With reference to a target value defined by the function pattern LP1, the microprocessing unit 43 controls the pressure control valve 42 to adjust the clamping pressure P so that the platen interval L follows the function pattern LP1. The stage S11 may be called a sixteenth step.

In the stage S12, the microprocessing unit 43 judges whether or not the platen interval L is coincident with the restriction end platen interval LE defined by the function pattern LP1. If the platen interval L is incoincident with the restriction end platen interval LE, the operation returns to the stage S11. Upon coincidence, generation of the function pattern LP1 is finished and the operation proceeds to the stage S13. The stage S12 may be called a seventeenth step. In the stage S13, the microprocessing unit 43 detects a clamping pressure P3 at the end of generation of the function pattern LP1 and makes the memory 44 memorize the clamping pressure P3.

In a stage S14', the microprocessing unit 43 makes the timer start measurement of a time duration t1 from the end of generation of the function pattern LP1. With reference to the clamping pressure P3 as a target value, the microprocessing unit 43 controls the pressure control valve 42 to maintain the clamping pressure at the target value P3 until the predetermined time duration t1 lapses. The stage S14 may be called an eighteenth step.

In the stage S14', with the progress of the holding process, the fill amount of the melted resin material filled in the mold is reduced because the gate of the mold is gradually sealed.

In addition, shrinkage of the melted resin material cooled and solidified in the mold reduces the platen interval L. In a stage S15', the microprocessing unit 43 monitors whether or not the predetermined time duration t1 lapses after the start of measurement of the predetermined time duration t1. When the predetermined time duration t1 does not lapse, the operation returns to the stage S14'. When the predetermined time duration t1 lapses, the operation proceeds to the stage S16' where the clamping pressure is increased and injection compression is started. The stage S15' may be called a nineteenth step.

As already described in conjunction with FIG. 11, in a stage S16', the microprocessing unit 43 generates the linear delay function pattern LP2 which decreases from the current platen interval to the predetermined minimum platen interval LM as a target value. The microprocessing unit 43 controls the pressure control valve 42 so that the platen interval L follows the linear delay function pattern LP2. Like the linear delay function pattern LP1 described above, the linear delay function pattern LP2 can be desiredly set when the operator changes the time constant T3 defining the function pattern. Alternatively, the memory 44 may memorize, as fixed values, preselected values for the time constant T3. To obtain an optimum pattern, the operator may select a particular one among those preselected values in dependence upon the solidifying rate of the melted resin material and the configuration of the molded product. The linear delay function pattern LP2 may be replaced by a simple function such as a linear function, in dependence upon processing ability of the microprocessing unit 43.

In the stage S17', the microprocessing unit 43 monitors whether or not the platen interval L is coincident with the predetermined minimum platen interval LM defined by the linear delay function pattern LP2, as described in the foregoing. Upon incoincidence, the operation returns to the stage S16'. Upon coincidence, the operation proceeds to the stage S18 where the holding process is brought to an end. The stages S16' and S17' may collectively be called a twelfth step. As described above, one molding cycle is completed.

While this invention has thus far been described in conjunction with the several embodiments, it is possible for those skilled in the art to put this invention in various other manners. For example, although the hydraulic molding apparatus has been described in the foregoing embodiments, this invention is also applicable to a disk molding apparatus or an electric molding apparatus. In case of the electric molding apparatus, control factors include not only pressures but also electric current and torques made to correspond to the pressures.

What is claimed is:

1. An injection molding machine for carrying out an injection molding cycle including a filling process and a holding process and which comprises a mold composed of a fixed mold attached to a fixed platen and a movable mold attached to a movable platen, and a driving source for driving said movable platen to open and close said mold, said injection molding machine further comprising:

means for injecting resin into the mold when in a mold closed position;

a distance sensor for detecting, as a platen interval, a distance between two positions preliminarily selected on said fixed platen and said movable platen during said mold closed position to produce a distance detection signal representative of said platen interval;

a pressure sensor for detecting a clamping pressure applied by said driving source to produce a pressure detection signal representative of said clamping pressure;

a setting unit for entering a preselected platen interval and a preselected clamping pressure, said preselected platen interval and said preselected clamping pressure being preselected values; and a control unit responsive to said preselected values, said distance detection signal, and said pressure detection signal for controlling said driving source to adjust said platen interval and said clamping pressure to maintain said platen interval.

2. An injection molding machine as claimed in claim 1, wherein said control unit carries out, during said filling process, a first step of controlling said driving source to make said platen interval have a predetermined value L0 so as to hold said mold by a minimum clamping pressure required to close said mold.

3. An injection molding machine as claimed in claim 2, wherein said control unit carries out second and third steps following said first step, said second step being a step of monitoring said clamping pressure to judge whether or not a slope of an increasing curve of said clamping pressure is constant or whether or not said slope reaches a predetermined level, said third step being a step of switching from said filling process to said holding process when said slope is constant or when said slope reaches said predetermined level.

4. An injection molding machine as claimed in claim 3, wherein said control unit carries out fourth through sixth steps following said third step, said fourth step being a step of detecting said clamping pressure at the time instant of switching from said filling process to said holding process to control said driving source so as to maintain said clamping pressure as detected, said fifth step being a step of judging whether or not said platen interval increasing with progress of said resin filling process reaches a first predetermined value LS, said sixth step being a step of controlling said driving source to adjust said clamping pressure so that said platen interval follows a predetermined variation pattern after said platen interval reaches said first predetermined value LS, said predetermined variation pattern having a reaching point at a second predetermined value LE.

5. An injection molding machine as claimed in claim 4, wherein said control unit generates as said predetermined variation pattern a function pattern having a configuration which can be desiredly modified.

6. An injection molding machine as claimed in claim 4, wherein said control unit selects said predetermined variation pattern from a plurality of predetermined patterns.

7. An injection molding machine as claimed in claim 4, wherein said control unit carries out seventh through ninth steps following said sixth step, said seventh step being a step of judging whether or not said platen interval reaches said second predetermined value LE, said eighth step being a step of detecting, when said platen interval reaches said second predetermined value LE, said clamping pressure at that time instant to control said driving source so as to maintain said clamping pressure as detected, said ninth step being a step of detecting an inflection point of a decreasing curve of said platen interval decreasing due to shrinkage of a melted resin material cooled and solidified within said mold after said eighth step, said control unit making an injection compression operation be started when said inflection point is detected.

8. An injection molding machine as claimed in claim 7, wherein said control unit carries out a tenth step following said ninth step, said tenth step being a step of controlling said driving source so that said clamping pressure follows a predetermined ascending pattern after said inflection point is detected, said predetermined ascending pattern having a reaching point at a predetermined value PM.

9. An injection molding machine as claimed in claim 8, wherein said control unit generates, as said predetermined ascending pattern, a function pattern having a configuration which can be desiredly modified.

10. An injection molding machine as claimed in claim 8, wherein said control unit is adapted to select said predetermined ascending pattern among a plurality of predetermined patterns.

11. An injection molding machine as claimed in claim 8, wherein said control unit brings said holding process to an end when said clamping pressure reaches said predetermined value PM in said tenth step.

12. An injection molding machine as claimed in claim 7, wherein said control unit carries out a tenth step following said ninth step when said inflection point is detected, said tenth step being a step of controlling said driving source so that said platen interval follows a predetermined descending pattern, said descending pattern having a reaching point at a predetermined value LM, said control unit bringing said holding process to an end when said platen interval reaches said predetermined value LM in said tenth step.

13. An injection molding machine as claimed in claim 12, wherein said control unit generates, as said predetermined descending pattern, a function pattern having a configuration which can be desiredly modified.

14. An injection molding machine as claimed in claim 12, wherein said control unit is adapted to select said predetermined descending pattern among a plurality of predetermined patterns.

15. An injection molding machine as claimed in claim 2, said control section further comprising screw position detecting means for detecting a screw position to produce a screw position detection signal representative of said screw position, said control unit carrying out, following said first step:

a second step of judging, in response to said screw position detection signal, whether or not said screw reaches a preselected position;

a third step of switching from said filling process to said holding process when it is judged that said screw reaches said preselected position;

a fourth step of detecting, when said holding process is started, said clamping pressure at the time instant of switching from said filling process to said holding process to control said driving source so as to maintain said clamping pressure as detected;

a fifth step of judging whether or not said platen interval increasing with progress of said filling process reaches a first predetermined value LS;

a sixth step of controlling said driving source to adjust said clamping pressure so that said platen interval follows a predetermined variation pattern having a reaching point at a second predetermined value LE after judgement is made that said platen interval reaches said first predetermined value LS;

a seventh step of judging whether or not said platen interval reaches said second predetermined value LE;

an eighth step of detecting, when said platen interval reaches said second predetermined value LE, said clamping pressure at that time to control said driving source so as to maintain said clamping pressure as detected during a predetermined time duration t1;

a ninth step of judging whether or not said predetermined time duration t1 lapses; and a tenth step of controlling said driving source so that said platen interval follows a descending pattern having a reaching point at a predetermined value LM after it is judged that said predetermined time duration t1 lapses;

said control unit bringing said holding process to an end when said platen interval reaches said predetermined value LM in said tenth step.

\* \* \* \* \*